United States Patent [19]

Ogawa

[11] Patent Number: 5,426,479
[45] Date of Patent: Jun. 20, 1995

[54] APPARATUS FOR CHANGING THE SIZE OF THE PHOTOGRAPHING APERTURE IN A CAMERA

[75] Inventor: Yuji Ogawa, Tokyo, Japan

[73] Assignee: Asahi Kogaku Kogyo Kabushiki Kaisha, Tokyo, Japan

[21] Appl. No.: 177,971

[22] Filed: Jan. 6, 1994

[30] Foreign Application Priority Data

Jan. 8, 1993 [JP] Japan ................. 5-000233 U

[51] Int. Cl.⁶ ............... G03B 17/02; G03B 37/00
[52] U.S. Cl. ............................ 354/159; 354/94
[58] Field of Search ........................ 354/94, 159

[56] References Cited

U.S. PATENT DOCUMENTS

| | | | |
|---|---|---|---|
| 4,611,895 | 9/1986 | Seely | 354/159 |
| 4,716,427 | 12/1987 | Shyu | 354/159 |
| 4,987,436 | 1/1991 | Misawa | 354/203 |
| 5,010,357 | 4/1991 | Misawa | 354/159 |
| 5,066,971 | 11/1991 | Kodaira | 354/465 |
| 5,086,311 | 2/1992 | Naka et al. | 354/195.1 |
| 5,258,790 | 11/1993 | Tanaka | 354/94 |
| 5,298,929 | 3/1994 | Tsunefuji et al. | 354/159 |
| 5,305,051 | 4/1994 | Irie et al. | 354/441 |
| 5,325,140 | 6/1994 | Torikoshi | 354/159 |
| 5,327,183 | 7/1994 | Kurei | 354/129 |
| 5,335,031 | 8/1994 | Ogawa | 354/159 |
| 5,345,285 | 9/1994 | Hasushita et al. | 354/159 |

FOREIGN PATENT DOCUMENTS 572655  3/1993  Japan .

*Primary Examiner*—M. L. Gillner
*Assistant Examiner*—Nicholas J. Tuccillo
*Attorney, Agent, or Firm*—Sandler, Greenblum & Bernstein

[57] ABSTRACT

An apparatus for changing a size of a camera's photographing aperture, which defines an image area on a film, includes a mechanism for intercepting light within the photographing aperture. The light intercepting mechanism is movable between a retracted position, in which the aperture is fully opened, and a projected position, in which the aperture is partly covered. The apparatus further includes an association mechanism which moves the light intercepting mechanism between the retracted position and the projected position. At least a forward most projecting edge of the light intercepting mechanism is moved towards the film when the light intercepting mechanism is moved into the projected position.

21 Claims, 5 Drawing Sheets

APPARATUS FOR CHANGING THE SIZE OF THE PHOTOGRAPHING APERTURE IN A CAMERA

BACKGROUND OF THE INVENTION

1. Field of the Invention

The present invention relates to an apparatus for changing the size of a photographing aperture in a camera, for example, from a standard size to a panoramic size (or a half size, etc.) and back to the standard size.

2. Description of Related Art

There are known cameras in which the size of a photographing aperture can be varied from a standard size (24 mm×36 mm) to a small size, e.g., a panoramic size (13 mm×36 mm), while a film roll is inserted in the camera. To change the photographing aperture size, it is known to provide a pair of light intercepting plates in the vicinity of a photographing aperture which defines a standard size photographing aperture. The pair of light intercepting plates are advanced into the photographing aperture by a predetermined amount to reduce the size of the photographing aperture. When the photographing aperture size is changed back to the standard size, the pair of light intercepting plates are retracted from the photographing aperture. In the known photographing aperture changing apparatus, the pair of light intercepting plates are positioned in the vicinity of the photographing aperture on the side of a photographing lens (i.e., object side) of the camera and are moved into and retracted from the photographing aperture in a linear manner (i.e., the plates are moved in a plane perpendicular to an optical axis of the photographing lens).

In a conventional camera having the above structure, since the pair of light intercepting plates are positioned in the vicinity of the photographing aperture, but on the side of the photographing aperture nearest to the photographing lens, the pair of light intercepting plates and the film plane are further apart from one another than the photographing aperture and the film. As a result, when a picture is taken with the reduced size aperture, a pair of edges of a photographing image on a film are likely to be blurred. The blurred edges correspond to the edges of the light intercepting plates. Furthermore, when a picture is taken with the reduced size aperture, the aperture which is defined by the pair of light intercepting plates sometimes does not correspond to the actual size of the photographing image on a film. Specifically, in the case of an SLR camera to which various types of photographing lenses can be detachably attached, the actual photographing image on a film tends not to correspond to a desired photographing size, since an angle of light rays incident on an image surface varies depending upon the focal length of the photographing lens.

SUMMARY OF THE INVENTION

The primary object of the present invention is to provide a photographing aperture size changing apparatus which makes it possible to obtain a stable reduced size photographing image that corresponds to the reduced size photographing aperture regardless of the type of photographing lens or focal length, and also to obtain a reduced size photographing image having clearly defined edges.

To achieve the object mentioned above, according to the present invention, there is provided an apparatus for changing a size of a photographing aperture of a camera, wherein the photographing aperture defines an image area on a film. The apparatus comprises a mechanism for intercepting light within the photographing aperture. The light intercepting mechanism is movable between a retracted position, in which the aperture is fully opened, and a projected position in which the aperture is partly covered. The apparatus further comprises an association mechanism which moves the light intercepting mechanism between the retracted position and the projected position, wherein at least a forward most projecting edge of the light intercepting mechanism is moved towards the film when moved into the projected position.

With this structure, since the forward most projecting edge of the light intercepting mechanism is moved towards the film when in the projected position, a stable photographing image on a film can be obtained regardless of the focal length. Furthermore, a reduced size photographing image having sharp edges can be obtained.

The present disclosure relates to subject matter contained in Japanese utility model application No. 05-223 (filed on Jan. 8, 1993) which is expressly incorporated herein by reference in its entirety.

BRIEF DESCRIPTION OF THE DRAWINGS

The present invention will be described below in detail with reference to the accompanying drawings, in which.

DESCRIPTION OF THE PREFERRED EMBODIMENT

Figure 3:
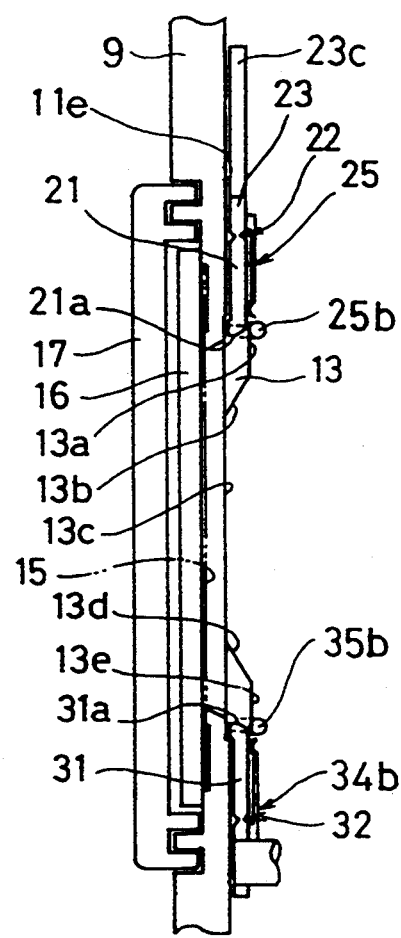
FIG. 3 is a longitudinal sectional view along line III—III shown in FIG. 2.
Figure 5:
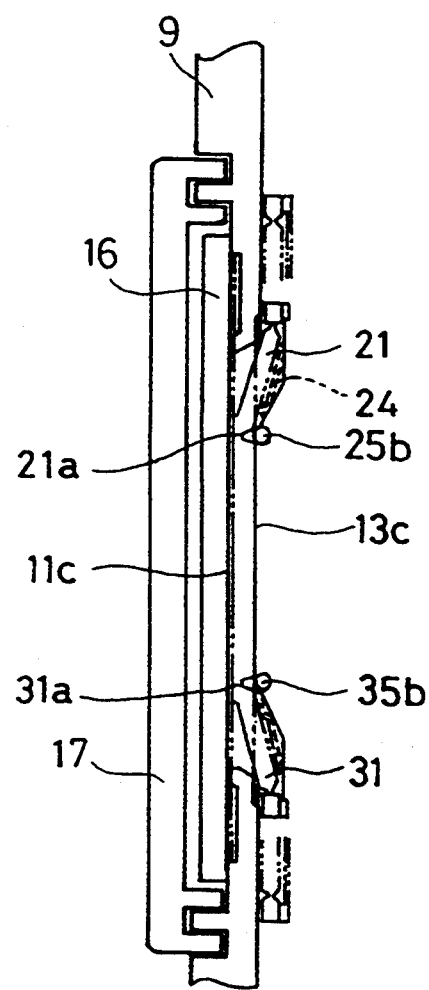

A photographing aperture size changing apparatus 10 is provided adjacent to a photographing aperture 11 and orthogonal to an optical axis direction of a photographing lens (not shown). The aperture 11 is formed in a camera body 9 (see FIG. 3) and is defined by aperture edges 11a, 11b, 11c, and 11d formed on the camera body 9. The aperture 11 defines a standard size photographing aperture. The photographing aperture size changing apparatus 10 includes a pair of light intercepting plates, i.e., light intercepting plates 21 and 31. When a standard size aperture is selected, the light intercepting plates 21 and 31 are positioned outside the aperture 11, above the aperture edge 11b, and below the aperture edge 11d, so that they do not intercept a photographing light path defined by the aperture 11. When a reduced size, i.e., panoramic size aperture is selected, the light intercepting plates 21 and 31 are advanced into the aperture 11 by a predetermined amount, and plate edges 21a and 31a define upper and lower edges of a panoramic size photographing aperture. Right and left edges of the panoramic size photographing aperture are defined by the aperture edges 11a and 11c. In FIGS. 3 and 5, numerals 15, 16, and 17 designate a film, a pressure plate, and a back cover, respectively.

The first light intercepting plate 21 is connected to a first frame member 23 through a deformable hinge 22. The first frame member 23 is formed in a manner such that it surrounds a photographing light path defined by the aperture 11. The first frame member 23 is guided by a guiding member (not shown) in a direction perpendicular to the optical axis. The second light intercepting plate 31 is connected to a second frame member 33 through a deformable hinge 32. The second frame member 33 is positioned outside the photographing light path on the opposite side of the first light intercepting plate 21. The first and second frame members 23 and 33 are interlocked in a manner such that they can move towards and away from each other in parallel directions by means of first and second levers 41 and 42. The first and second levers 41 and 42 are rotatable about a pivot 43. The pivot 43 is fixed to the camera body 9. More details regarding the first and second frame members 23 and 33 will be discussed later.

A leaf spring 24, which biases the first light intercepting plate 21 towards the film 15 is fixed on a surface of the first frame member 23 near the center thereof on a photographing lens side (i.e., object side). The tip of the leaf spring 24 biases the first light intercepting plate 21 in a direction in which the first light intercepting plate 21 rotates at the deformable hinge 22 towards the film 15. Pins 25a and 25b are provided on the first light intercepting plate 21. The pins 25a and 25b are positioned at right and left sides of the first light intercepting plate 21 on the photographing lens side, respectively, in the vicinity of a plate edge 21a of the first light intercepting plate 21.

Figure 1:
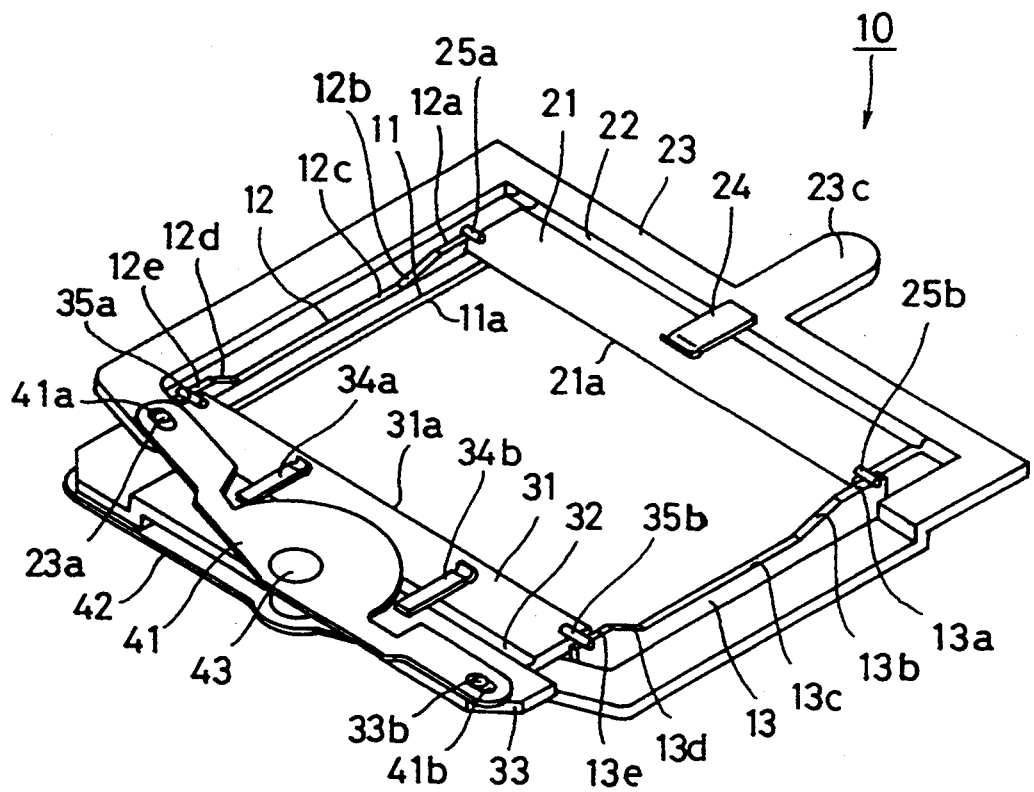
FIG. 1 is an isometric view of a main portion of a photographing aperture size changing apparatus, illustrating light intercepting plates in a retracted position, seen from a side of a photographing lens barrel, according to an embodiment of the present invention.
Figure 2:
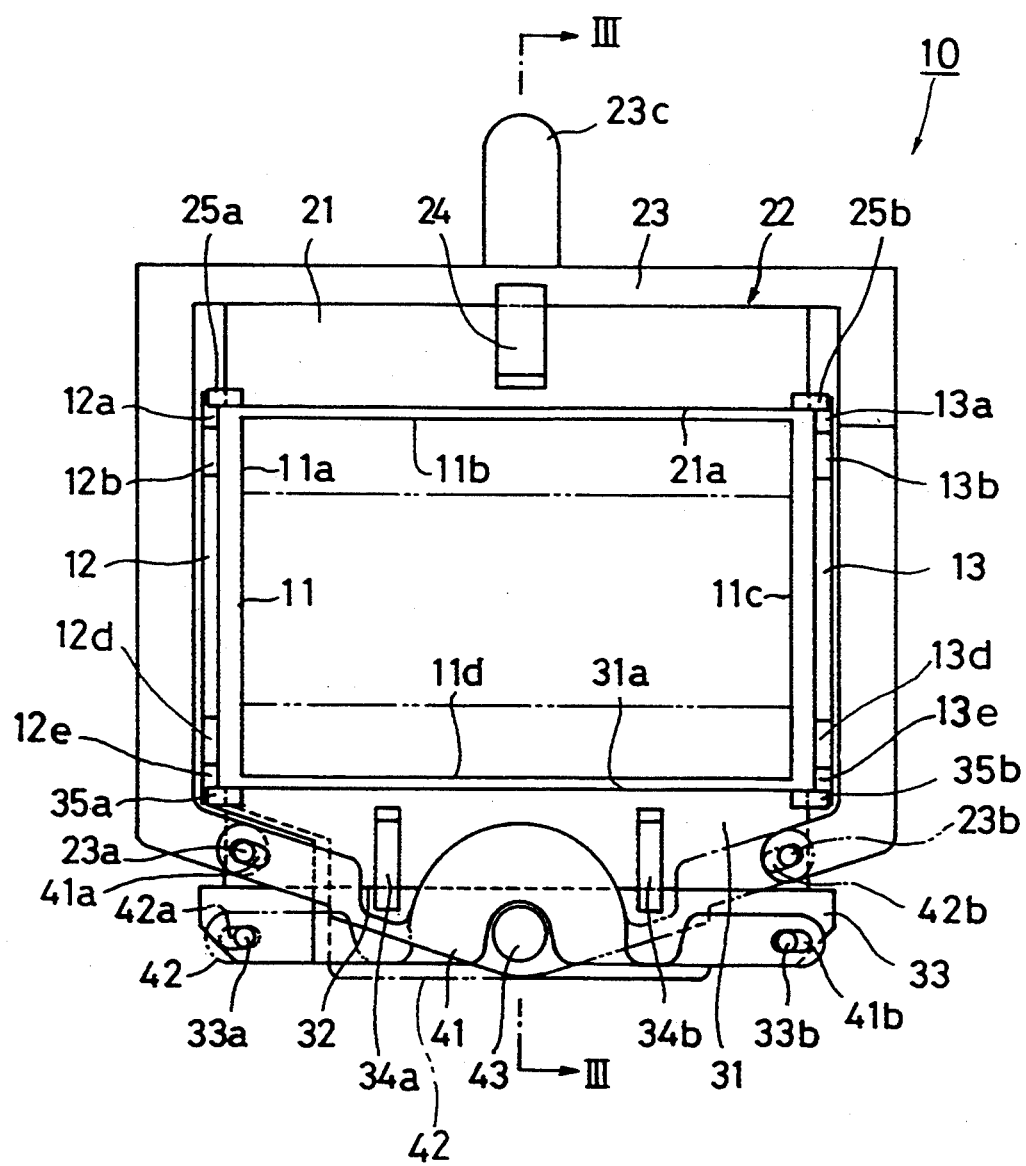
FIG. 2 is a front elevational view of the main portion of FIG. 1, illustrating light intercepting plates in a retracted position, seen from a side of a photographing lens barrel.
Figure 4:
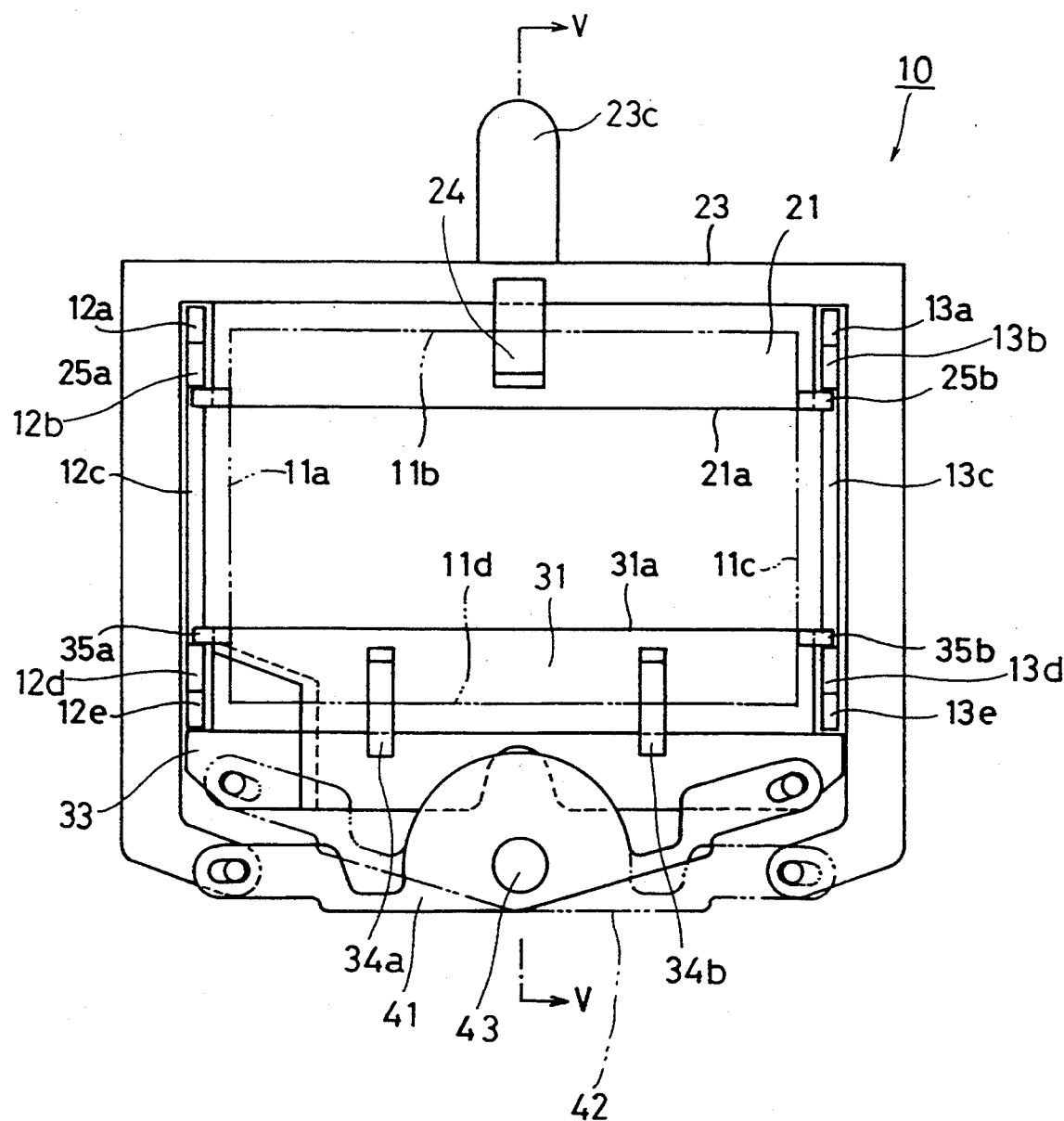
FIG. 4 is a front elevational view of the main portion of FIG. 1, illustrating light intercepting plates in a panoramic position, seen from a side of a photographing lens barrel; and, FIG. 5 is a longitudinal sectional view along line V—V shown in FIG. 4.

The pins 25a and 25b are biased against guiding rails 12 and 13 by a restoring force of the leaf spring 24. The guiding rails 12 and 13 are formed on the camera body 9 at right and left sides of the aperture 11. The pins 25a and 25b are always in slidable contact with the guiding rails 12 and 13 due to the restoring force of the leaf spring 24. The pins 25a and 25b slide along the guiding rails 12 and 13, respectively, when a photographing aperture size is changed. Accordingly, the positions of the pins 25a and 25b in a direction perpendicular to a plane of the film 15 are defined by the guiding rails 12 and 13. Numeral 23c designates a projection which is interlocked with an operating switch (not shown) provided on the camera body 9. The operating switch is for changing the size of the photographing aperture and is operated when a photographer desires to change the photographing aperture size. In accordance with the operation of the operating switch, the projection 23c is moved up or down as shown in FIGS. 2 and 4.

A couple of leaf springs 34a and 34b, which bias the second light intercepting plate 31 towards the film 15, are fixed on a surface of the second frame member 33 at predetermined positions on the photographing lens side. The tips of the leaf springs 34a and 34b bias the second light intercepting plate 31 towards the film 15. The second light intercepting plate 31 rotates about the deformable hinge 32 due to the force of the leaf springs 34a and 34b. Pins 35a and 35b are provided on the second light intercepting plate 31. The pins 35a and 35b are positioned at right and left sides of the second light intercepting plate 31 on the photographing lens side, respectively, in the vicinity of a plate edge 31a of the second light intercepting plate 31.

The pins 35a and 35b are biased against the guiding rails 12 and 13 by a restoring force of the leaf springs 34a and 34b. The pins 35a and 35b are always in slidable contact with the guiding rails 12 and 13 due to the restoring force of the leaf springs 34a and 34b. The pins 35a and 35b slide along the guiding rails 12 and 13, respectively, when a photographing aperture size is changed. Accordingly, the positions of the pins 35a and 35b in a direction perpendicular to a plane of the film 15 are defined by the guiding rails 12 and 13.

The first and second levers 41 and 42 are positioned outside of the photographing light path defined by the aperture 11. The first frame member 23 is positioned between the first and second levers 41 and 42. An elongated hole 41a is formed in one end of the first lever 41. A pin 23a is provided on the first frame member 23 and is engaged with the elongated hole 41a. An elongated hole 41b is formed in the other end of the first lever 41. A pin 33b is provided on the second frame member 33 and is engaged with the elongated hole 41b.

Likewise, an elongated hole 42a is formed in one end of the second lever 42. A pin 33a is provided on the second frame member 33 and is engaged with the elongated hole 42a. An elongated hole 42b is formed in the other end of the second lever 42. A pin 23b is provided on the second frame member 23 and is engaged with the elongated hole 42b. With this structure, when the first frame member 23 is moved towards the second frame member 33 (i.e., in the direction in which the photographing aperture size is changed to the panoramic size), the second frame member 33 moves towards the first frame member 23, as shown in FIG. 2. To the contrary, when the first frame member 23 is moved away from the second frame member 33 (i.e., in the direction in which the photographing aperture size is changed to the standard size), the second frame member 33 moves away from the first frame member 23, as shown in FIG. 2.

The profiles of the guiding rails 12 and 13 in a side view of the apparatus 10 are coincident. The guiding rail 12 has raised portions 12a and 12e at upper and lower ends, respectively, for spacing the light intercepting plates 21 and 31 far from the film 15. The guiding rail 12 also has a lowered portion 12c in the middle thereof for spacing the light intercepting plates 21 and 31 close to the film 15, and connecting sloped portions 12b and 12d. The guiding rail 13 has corresponding raised portions 13a and 13e at upper and lower ends, respectively, a lowered portion 13c in the middle thereof, and connecting sloped portions 13b and 13d. When the standard size is selected, the pins 25a, 25b, 35a, and 35b are positioned on the raised portions 12a, 13a, 12e, and 13e, respectively, at a position far from the film 15 (i.e., distant position) by a predetermined distance in the optical axis direction (See FIGS. 2 and 3). When the panoramic size is selected, the pins 25a and 35a, and pins 25b and 35b are positioned on the lowered portions 12c and 13c, respectively, at a position which is close to the film 15 in the optical axis direction (See FIGS. 4 and 5).

The photographing aperture size changing apparatus of the present invention operates as follows:

When the standard photographing aperture size is selected, the first light intercepting plate 21 is positioned outside the aperture 11 above the aperture edge 11b. When the light intercepting aperture 21 is moved into the panoramic position from the standard position by an operation of the operation switch (not shown), the first lever 41, which is connected to the pin 23a, is rotated in the counterclockwise direction and the second lever 42, which is connected to the pin 23b, is rotated in the clockwise direction in FIG. 2. Accordingly, the first and second light intercepting plates 21 and 31 are slid towards each other. The pins 25a and 25b slide across the raised portions 12a and 13a, onto the connecting sloped portions 12b and 13b, and subsequently onto the lowered portions 12c and 13c, respectively. Similarly, the pins 35a and 35b slide across the raised portions 12e and 13e, onto the connecting sloped portions 12d and 13d, and subsequently onto the lowered portions 12c and 13c, respectively (see FIG. 5). Accordingly, the plate edges 21a and 31a are brought nearer the film 15. As a result, the panoramic size photographing aperture is defined by the aperture edges 11a and 11c and the plate edges 21a and 31a.

When the first light intercepting plate 21 is moved into the standard position by an operation of the operating switch, the first and second levers 41 and 42 are rotated in clockwise and counterclockwise directions, respectively, and the second light intercepting plate 31 is moved in the standard photographing aperture direction. The pins 25a and 25b slide across the lowered portions 12c and 13c, onto the connecting sloped portions 12b and 13b, and subsequently onto the raised portions 12a and 13a, respectively. Similarly, the pins 35a and 35b slide across the lowered portions 12c and 13c, onto the connecting sloped portions 12d and 13d, and subsequently onto the raised portions 12e and 13e, respectively. Accordingly, the first and second light intercepting plates 21 and 31 retract from the photographing light path defined by the aperture 11.

As can be seen from the foregoing, according to the present invention, since the plate edges 21a and 31a are brought nearer the film 15 when the panoramic size photographing aperture is selected, the selected aperture, i.e., the standard or panoramic size photographing aperture, will be substantially the same size as the corresponding photographing image on a film. Furthermore, the edges of the photographing image will be sharp, even if the angle of light rays incident upon the film 15 varies.

Furthermore, since the first and second light intercepting plates 21 and 31 are brought near and away from the film 15 when the photographing aperture size is changed, it is unlikely that the first and second light intercepting plates 21 and 31 will scratch and damage the film 15. Moreover, since only the first and second light intercepting plates 21 and 31 are brought towards and away from the film 15, whereas the first and second frame members 23 and 33 move in a parallel fashion, without moving nearer to the film 15, it is not necessary to increase the space for installment of apparatus 10 in the camera body 9 in the optical axis direction. Therefore, the apparatus 10 can be easily fitted in a camera, even in an SLR camera having a focal plane shutter.

In the above embodiment, the guiding rails 12 and 13 may be replaced with guiding grooves in which the pins 25 and 35 are slidably engaged with the corresponding grooves. It is possible to make the deformable hinges 22 and 32 of an elastic material having a restoring force which biases the first and second light intercepting plates 21 and 31 towards the film 15, respectively. In this arrangement, it is not necessary to provide the leaf springs 24 and 34.

In the above embodiment, the reduced photographing aperture size is directed to the panoramic size. However, it is possible to change the standard photographing aperture size to a half size or other sizes, e.g., a hi-vision size having the dimensions of 16 mm by 9 mm.

Although the invention has been described with reference to particular means, materials and embodiments, it is to be understood that the invention is not limited to the particulars disclosed and extends to all equivalents within the scope of the claims.

I claim:

1. An apparatus for changing a size of a photographing aperture of a camera, wherein said photographing aperture defines an image area on a film, comprising:
    means for intercepting light within said photographing aperture, said light intercepting means being translationally movable between a retracted position, in which said aperture is fully opened, and a projected position, in which said aperture is partly covered;
    tracking elements provided on said means for intercepting light; and
    an association mechanism for controlling movement of said light intercepting means, by guiding said tracking elements between said retracted position and said projected position, wherein at least a forward most projecting edge of said light intercepting means is moved towards the film when said light intercepting means are translated into said projected position.

2. The apparatus of claim 1, wherein said tracking elements comprise projections provided on said means for intercepting light; and
    said association mechanism for controlling movement of said light intercepting means comprising a guiding portion fixedly formed on a camera body;
    wherein said projections are in sliding contact with said guiding portion and said projections are moved toward the film along a profile of said guiding portion when said means for intercepting light are moved into said projected position.

3. The apparatus of claim 2, wherein said means for intercepting light comprise a pair of light intercepting plates; and
    said projections comprise pins which extend from edges of said light intercepting plates.

4. The apparatus of claim 1, wherein said light intercepting means comprises a pair of light intercepting plates, each of said light intercepting plates comprising a forward most projecting edge.

5. The apparatus of claim 4, wherein said association mechanism comprises a guiding portion formed on a camera body and at least one of said tracking elements is provided on each of said light intercepting plates, wherein each said tracking element is in slidable contact with said guiding portion and guided by said guiding portion.

6. The apparatus of claim 4, wherein said association mechanism further comprises a pair of moving members which are guided in a direction perpendicular to the film, a shaft secured to a camera body, and a connecting rotatable means which is rotatably mounted to said shaft, said connecting rotatable means being connected at one end thereof to one of said moving members and at the other end thereof to the other moving member, and wherein rotation of said connecting rotatable means causes said moving members to move in association with each other, and further wherein said light intercepting plates are connected to said moving members by a deformable member.

7. The apparatus of claim 6, wherein said connecting rotatable means comprises a pair of rotatable plates which are relatively rotatable and mounted to said shaft in a superposed configuration.

8. The apparatus of claim 3, wherein said guiding portion comprises three different sections, including a raised section, which is positioned away from the film by a predetermined distance, a lowered section, which is positioned closer to the film than said raised section, and a sloped section, which connects said raised section and said lowered section.

9. The apparatus of claim 5, wherein each said at least one of said tracking elements is provided in the vicinity of each said forward most projecting edge, respectively.

10. The apparatus of claim 5, wherein said association mechanism further comprises means for biasing said light intercepting plates toward said film.

11. The apparatus of claim 5, wherein said biasing means comprises a leaf spring.

12. An apparatus for changing a photographing aperture size, said photographing aperture defining an image area on a film, comprising:
a pair of light intercepting plates for intercepting light within said aperture, said light intercepting plates being movable between a retracted position, in which said aperture is fully opened, and a projected position, in which said aperture is partly covered, said pair of light intercepting plates comprising a pair of forward most projecting edges; and
an association mechanism which moves said light intercepting plates in association with each other between said retracted position and said projected position, said association mechanism comprises a driving component for moving said light intercepting plates in a first direction parallel with a plane of the film, and a guiding component for guiding movement of at least said pair of forward most projecting edges in a second direction towards the film when said light intercepting plates are moved into said projected position.

13. The apparatus of claim 12, further comprising an aperture frame including aperture edges which define boundaries of said aperture when said light intercepting plates are in said retracted position;
wherein at least said pair of forward most projecting edges are substantially coplanar with said aperture edges when said light intercepting plates are in said projected position.

14. An apparatus of a camera for defining an aperture which defines an image area on a film, comprising:
a pair of light intercepting plates which are movable between a retracted position and a projected position, wherein inner edges of said pair of light intercepting plates define said image area at least when said pair of light intercepting plates are positioned at said projected position;
means for moving said pair of light intercepting plates in a direction substantially parallel to a plane of the film between said retracted and projected positions; and
means for guiding at least said inner edges of said light intercepting plates to move towards the film when said light intercepting plates are moved, by said moving means to be positioned in said projected position.

15. The apparatus of claim 14, further comprising an aperture frame including aperture edges which define boundaries of said aperture when said light intercepting plates are in said retracted position;
wherein at least said pair of forward most projecting edges are coplanar with said aperture edges when said light intercepting plates are in said projected position.

16. An apparatus of a camera for defining an aperture which defines an image area on a film, comprising:
light intercepting members which are movable between a retracted position and a projected position; and
a guide mechanism for guiding movement of a front edge of said light intercepting members along first and second linear paths, during movement between said retracted and projected positions, wherein said second path is toward the film.

17. An apparatus according to claim 16, wherein said first path is substantially parallel to a plane of the film.

18. An apparatus according to claim 16, wherein said front edges are moved nearer to said film along said second path when said members are moved along said first path to said projected position.

19. The apparatus of claim 18, further comprising an aperture frame including aperture edges which define boundaries of said aperture when said light intercepting plates are in said retracted position;
wherein at least said pair of forward most projecting edges are substantially coplanar with said aperture edges when said light intercepting plates are in said projected position.

20. An apparatus according to claim 16, said guide mechanism initially guiding said front edge along said first path and subsequently guiding said front edge toward a film plane.

21. The apparatus according to claim 16, further comprising a guiding portion fixedly formed on a camera body, and a projection provided on each of said light intercepting members, said projection being in slidable contact with said guiding portion and to be guided by said guiding portion to move said projection towards the film along a profile of said guiding portion when said light intercepting members are moved to said projected position.

* * * * *

UNITED STATES PATENT AND TRADEMARK OFFICE
CERTIFICATE OF CORRECTION

PATENT NO. : 5,426,479
DATED : June 20, 1995
INVENTOR(S) : Y. OGAWA

It is certified that error appears in the above-indentified patent and that said Letters Patent is hereby corrected as shown below:

On the cover, in section [56], "References Cited", "U.S. PATENT DOCUMENTS", line 10, after "Torikoshi" insert ---et al.---.

At column 7, line 9 (claim 8, line 1), change "3," to ---5,---.

At column 7, line 23 (claim 11, line 1), change "5," to ---10,---.

Signed and Sealed this

Twenty-sixth Day of November 1996

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,426,479
DATED : June 20, 1995
INVENTOR(S) : Y. OGAWA

It is certified that error appears in the above-indentified patent and that said Letters Patent is hereby corrected as shown below:

On the title page: in section [30], "Foreign Application Priority Data", change "5-000233 U" to ---5-000223 U---.

Signed and Sealed this

Fourteenth Day of January, 1997

Attest:

BRUCE LEHMAN

Attesting Officer     Commissioner of Patents and Trademarks